US012755129B2

(12) United States Patent
Kajikiya et al.

(10) Patent No.: US 12,755,129 B2
(45) Date of Patent: Oct. 6, 2026

(54) COIL COMPONENT AND IC CARD HAVING THE SAME

(71) Applicant: TDK Corporation, Tokyo (JP)

(72) Inventors: Shoma Kajikiya, Tokyo (JP); Tomohiro Moriki, Tokyo (JP); Makoto Hiraki, Tokyo (JP); Keisuke Hasegawa, Tokyo (JP); Toshio Tomonari, Tokyo (JP)

(73) Assignee: TDK CORPORATION, Tokyo (JP)

(*) Notice: Subject to any disclaimer, the term of this patent is extended or adjusted under 35 U.S.C. 154(b) by 0 days.

(21) Appl. No.: 19/083,429

(22) Filed: Mar. 19, 2025

(65) Prior Publication Data

US 2025/0299014 A1 Sep. 25, 2025

(30) Foreign Application Priority Data

Mar. 22, 2024 (JP) ................................ 2024-046261

(51) Int. Cl.

*G06K 19/00* (2006.01)
*G06K 19/077* (2006.01)
*H01F 17/04* (2006.01)
*H01F 27/29* (2006.01)

(52) U.S. Cl.

CPC ....... *G06K 19/07779* (2013.01); *H01F 17/04* (2013.01); *H01F 27/292* (2013.01); *H01F 2017/048* (2013.01)

(58) Field of Classification Search

CPC . G06K 19/07779; H01F 17/04; H01F 27/292; H01F 2017/048

See application file for complete search history.

(56) References Cited

U.S. PATENT DOCUMENTS 10,699,179 B1 * 6/2020 Yoon ................ G06K 19/07747
11,476,041 B2 * 10/2022 Suzuki .................. H01F 27/327
2009/0045905 A1 2/2009 Nakagawa et al.
2014/0209691 A1 * 7/2014 Finn ...................... H01F 27/363 235/492
2014/0333404 A1 * 11/2014 Bae ..................... H01F 17/0013 336/200

(Continued)

FOREIGN PATENT DOCUMENTS

EP 0481776 A2 * 4/1992 ....... G06K 19/07783
EP 1031939 A1 * 8/2000 ......... G06K 7/10178

(Continued)

OTHER PUBLICATIONS

WO2016199633A1 Coil Module and Method for Producing Same, 15 pages. (Year: 2025).*

*Primary Examiner* — Tuyen K Vo
(74) *Attorney, Agent, or Firm* — XSENSUS LLP

(57) ABSTRACT

Disclosed herein is a coil component that includes a magnetic body having a main surface, a first coil pattern disposed so as to overlap the main surface of the magnetic body, and a first resin layer disposed so as to overlap the main surface of the magnetic body and containing particles and binder resin. The first coil pattern has a first surface facing the main surface of the magnetic body and a second surface positioned on a side opposite to the first surface. The first coil pattern is embedded in the first resin layer such that at least the first and second surfaces of the first coil pattern are covered with the first resin layer.

13 Claims, 12 Drawing Sheets

(56) References Cited

U.S. PATENT DOCUMENTS

| | | | | |
|---|---|---|---|---|
| 2016/0104065 | A1* | 4/2016 | Tsukada | G06K 19/07794<br>235/492 |
| 2019/0088413 | A1* | 3/2019 | Kawaguchi | H01F 27/24 |
| 2020/0373064 | A1* | 11/2020 | Asai | H01F 27/324 |
| 2022/0076092 | A1* | 3/2022 | Kim | G06K 19/07769 |
| 2023/0352230 | A1* | 11/2023 | Kawakami | H01F 27/323 |
| 2024/0028860 | A1* | 1/2024 | Finn | G06K 19/07722 |

FOREIGN PATENT DOCUMENTS

| | | | | |
|---|---|---|---|---|
| EP | 1065627 | A2 * | 1/2001 | G06K 19/0775 |
| JP | 2017-005113 | A | 1/2017 | |
| WO | 2007/049692 | A1 | 5/2007 | |

* cited by examiner

COIL COMPONENT AND IC CARD HAVING THE SAME

CROSS-REFERENCE TO RELATED APPLICATION

This application claims the benefit of Japanese Patent Application No. 2024-046261, filed on Mar. 22, 2024, the entire disclosure of which is incorporated by reference herein.

BACKGROUND

The present disclosure relates to a coil component and an IC card having the same.

JP 2017-005113A discloses a coil module including a coil substrate having a coil pattern thereon, an adhesive layer covering the coil substrate so as to embed therein the coil pattern, and a magnetic layer bonded to the adhesive layer.

However, the coil module described in JP 2017-005113A has a problem that the entire thickness thereof increases due to the presence of the coil substrate.

SUMMARY

A coil component according to an embodiment of the present disclosure includes: a magnetic body having a main surface; a first coil pattern disposed so as to overlap the main surface of the magnetic body; and a first resin layer disposed so as to overlap the main surface of the magnetic body and containing particles and binder resin. The first coil pattern has a first surface facing the main surface of the magnetic body and a second surface positioned on a side opposite to the first surface. The first coil pattern is embedded in the first resin layer such that at least the first and second surfaces of the first coil pattern are covered with the first resin layer.

BRIEF DESCRIPTION OF THE DRAWINGS

The above features and advantages of the present disclosure will be more apparent from the following description of some embodiments taken in conjunction with the accompanying drawings, in which.

DETAILED DESCRIPTION OF THE EMBODIMENTS

The present disclosure relates to a coil component including a coil pattern and a magnetic body covering the coil pattern and describes a technology for reducing the entire thickness of the coil component while maintaining the reliability of the coil pattern.

Some embodiments of the present disclosure will be explained below in detail with reference to the accompanying drawings.

Figure 1:
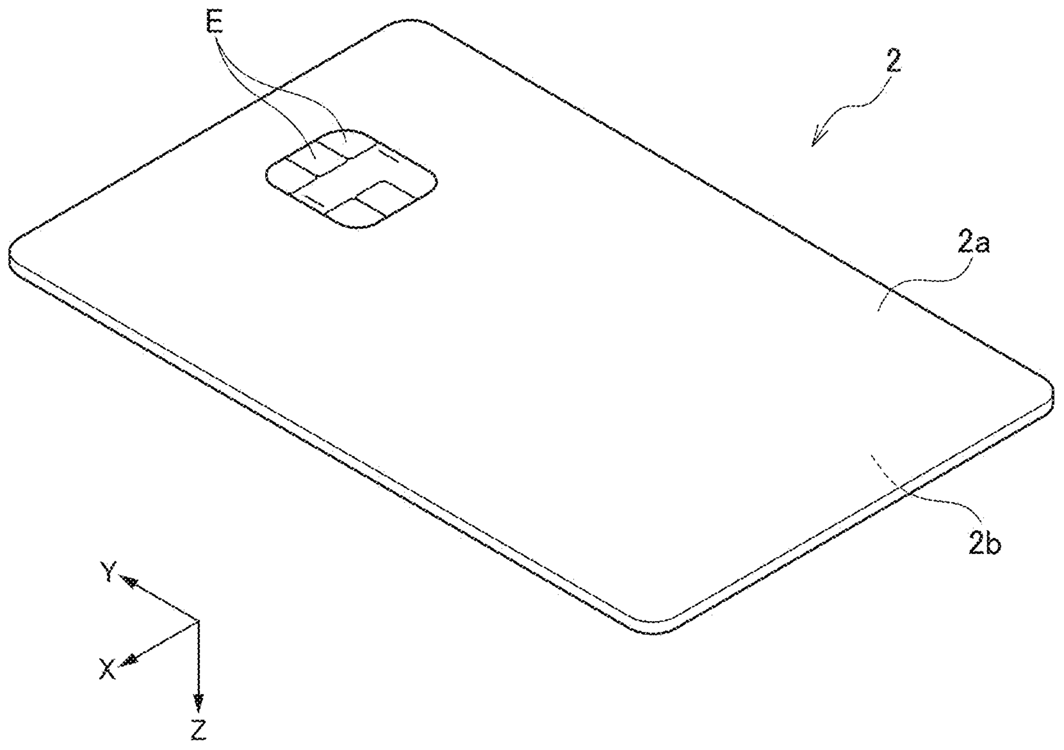
FIG. 1 is a schematic perspective view illustrating the outer appearance of an IC card 2 having a coil component according to an embodiment of the present disclosure.

FIG. 1 is a schematic perspective view illustrating the outer appearance of an IC card 2 having a coil component according to an embodiment of the present disclosure.

As illustrated in FIG. 1, the IC card 2 according to the present embodiment has a plate-like body in which the Y-, X-, and Z-directions thereof are respectively defined as the longer side direction, shorter side direction, and thickness direction and has an upper surface 2*a* and a back surface 2*b* which constitute the XY plane. The IC card 2 incorporates therein an IC module to be described later, and a terminal electrode E of the IC module is exposed to the upper surface 2*a* of the IC card 2.

Figure 2:
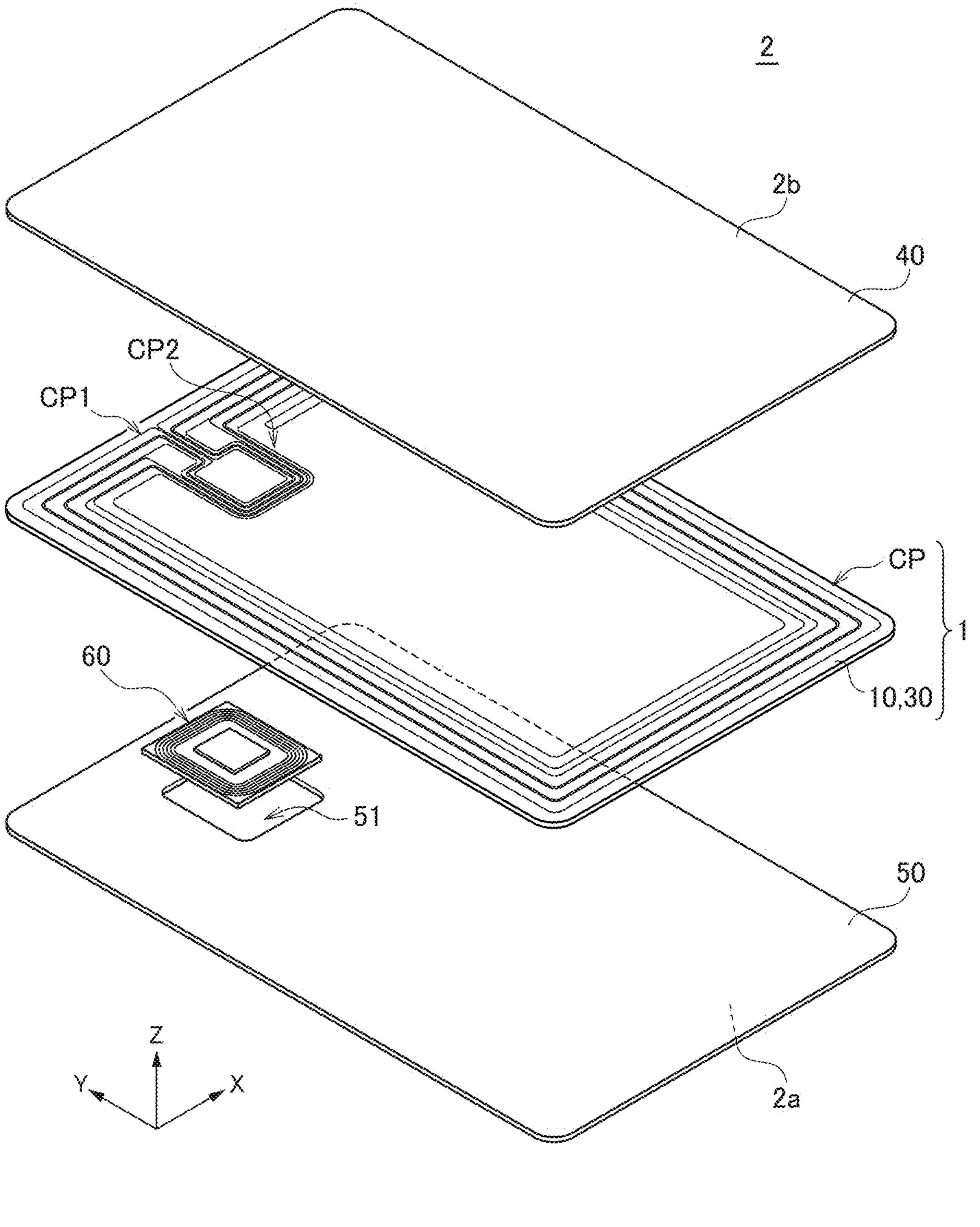
FIG. 2 is a schematic exploded perspective view for explaining the structure of the IC card 2 having a coil component 1.
Figure 3:
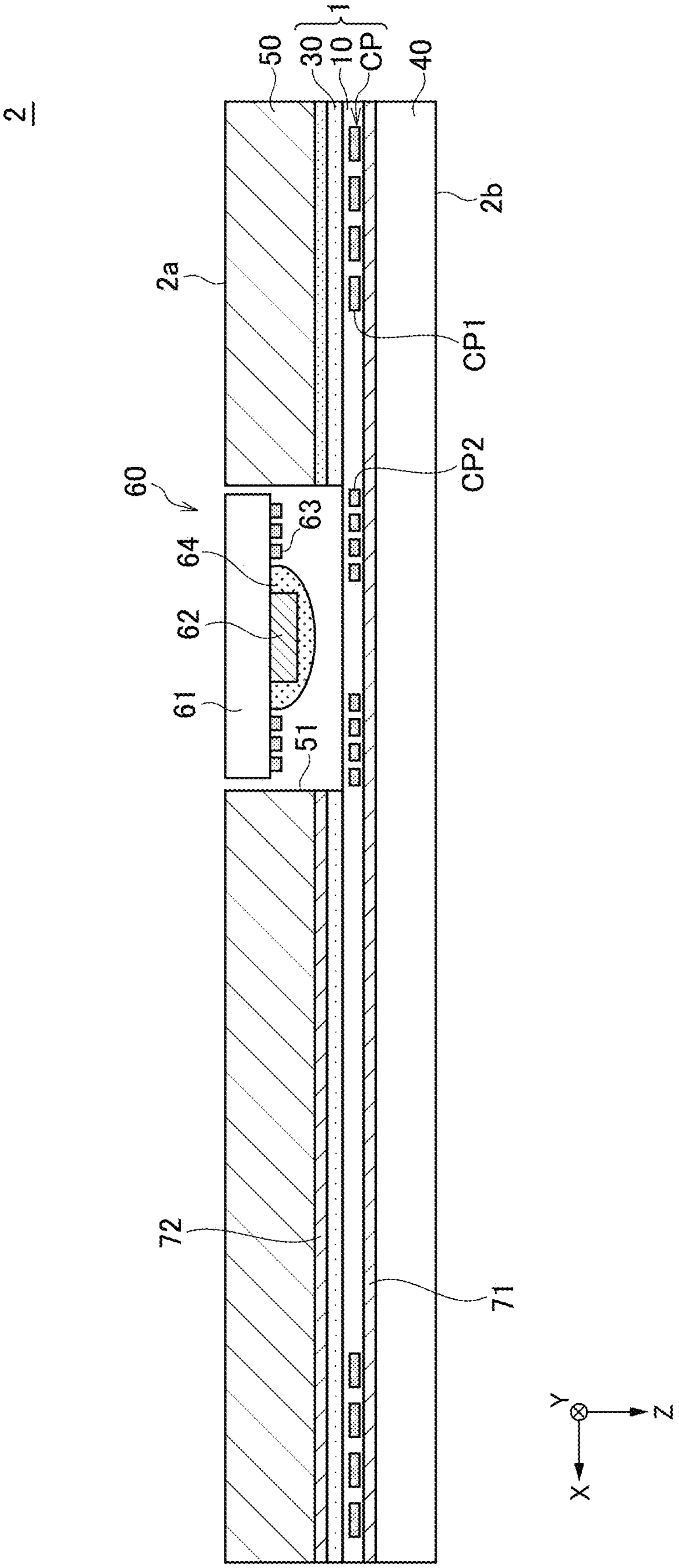
FIG. 3 is a schematic cross-sectional view for explaining the structure of the IC card 2 having a coil component 1.

FIGS. 2 and 3 are respectively a schematic exploded perspective view and a schematic cross-sectional view for explaining the structure of the IC card 2 having a coil component 1 according to the present embodiment.

The IC card 2 illustrated in FIGS. 2 and 3 has a structure in which a plastic plate 40, the coil component 1, and a metal plate 50 are laminated in this order from the back surface 2*b* side to the upper surface 2*a* side. The coil component 1 according to the present embodiment includes a magnetic body 30, a coil pattern CP, and a first resin layer 10. The coil pattern CP and first resin layer are disposed on one surface side (positive Z-direction side) of the magnetic body 30. The other surface side (negative Z-direction side) of the magnetic body 30 is covered with the metal plate 50.

The magnetic body 30 and metal plate 50 respectively have through holes 31 and 51. The through holes 31 and 51 overlap each other in the Z-direction (lamination direction). The plastic plate 40 and coil component 1 are bonded to each other through an adhesive layer 71. The metal plate 50 and coil component 1 are bonded to each other through an adhesive layer 72. Examples of the material of the adhesive layers 71 and 72 include an acrylic-based double-sided tape, a thermosetting resin, and a thermoplastic resin.

The plastic plate 40 is made of a resin material not blocking magnetic flux. The outer surface of the plastic plate 40 constitutes the back surface 2*b* of the IC card 2. The metal plate 50 is made of a metal material such as stainless steel or titanium. The outer surface of the metal plate 50 constitutes the upper surface 2*a* of the IC card 2. The metal plate 50 has a through hole 51 inside of which an IC module 60 is disposed. As described above, the IC card 2 is a card using a metal plate as its main body.

The IC module 60 includes a module substrate 61, an IC chip 2 mounted on or incorporated in the module substrate 61, and a coupling coil 63. The IC chip 62 is protected by being covered with a dome-shaped protective resin 64. The terminal electrode E illustrated in FIG. 1 is provided on the surface of the module substrate 61 on the side opposite to the side on which the IC chip 62 is mounted. The IC module 60 thus configured is electromagnetically coupled to a second coil pattern CP2 constituting a part of the coil pattern CP. This allows communication between an external card reader and the IC chip 62 through a first coil pattern CP1 constituting the other part of the coil pattern CP. In other words, the first coil pattern CP1 is an antenna coil, and the second coil pattern CP2 is a coupling coil.

Figure 4:
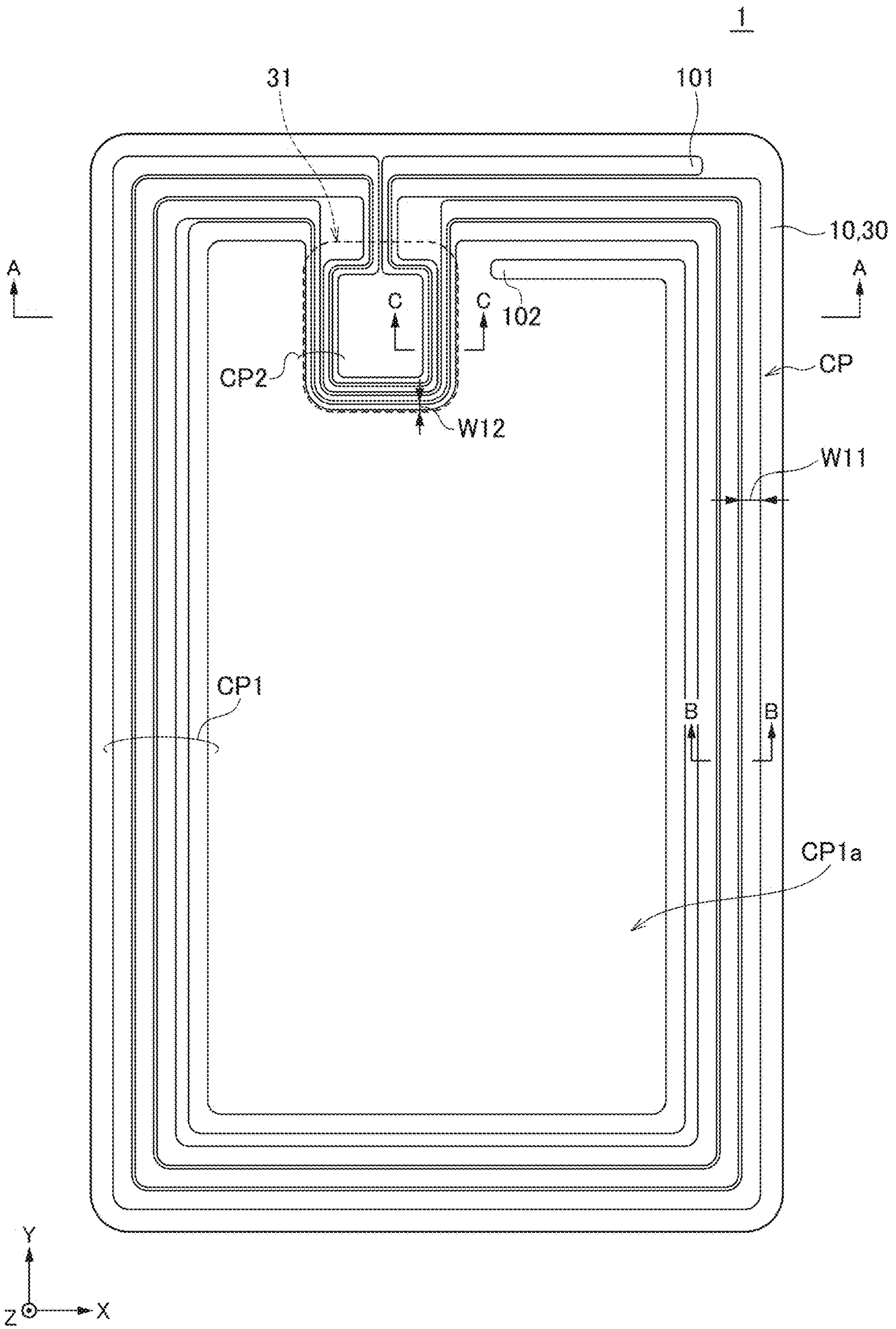
FIG. 4 is a schematic plan view for explaining the configuration of the coil component 1.

FIG. 4 is a schematic plan view for explaining the configuration of the coil component 1 according to the present embodiment. The line A-A in FIG. 4 indicates the sectional position of FIG. 3.

As illustrated in FIG. 4, the coil pattern CP included in the coil component 1 according to the present embodiment includes a first coil pattern CP1 wound in a plurality of turns along the outer edge of the magnetic body 30 and a second coil pattern CP2 wound in a plurality of turns connected respectively to the turns of the first coil pattern CP1 and disposed so as to overlap the through hole 31 of the magnetic body 30. The first and second coil patterns CP1 and CP2 are positioned on the same plane. The second coil pattern CP2 overlaps the IC module 60 disposed in the through hole 51 of the metal plate 50 in the Z-direction through the through hole 31 of the magnetic body 30.

In the example illustrated in FIG. 4, the first and second coil patterns CP1 and CP2 are both wound in about four turns. The second coil pattern CP2 is a part of the first coil pattern CP1 that protrudes toward an opening CP1*a*. That is, each turn of the coil pattern CP includes the first coil pattern CP1 with less than one turn and the second coil pattern CP2 with less than one turn.

The first coil pattern CP1 functions as an antenna coil coupled to an external card reader in actual use. The second coil pattern CP2 functions as a coupling coil coupled to the IC module 60. The second coil pattern CP2 may function as a part of the antenna coil coupled to the external card reader. A pattern width W11 of the first coil pattern CP1 may be larger than a pattern width W12 of the second coil pattern CP2. This reduces the DC resistance of the first coil pattern CP1 and ensures a sufficient opening size of the second coil pattern CP2. When the pattern width of the first coil pattern CP1 is not uniform, the pattern width W11 may be defined by the maximum pattern width, minimum pattern width, or average pattern width of the first coil pattern CP1. Similarly, when the pattern width of the second coil pattern CP2 is not uniform, the pattern width W12 may be defined by the maximum pattern, minimum pattern, or average pattern of the second coil pattern CP2.

Further, when an outer peripheral end 101 and an inner peripheral end 102 of the coil pattern CP are set as the starting point and the end point, respectively, the first and second coil patterns CP1 and CP2 are wound left-handed (counterclockwise direction) and right-handed (clockwise direction) as viewed in the direction of FIG. 4. That is, the first and second coil patterns CP1 and CP2 are wound in mutually opposite directions.

Figure 5:
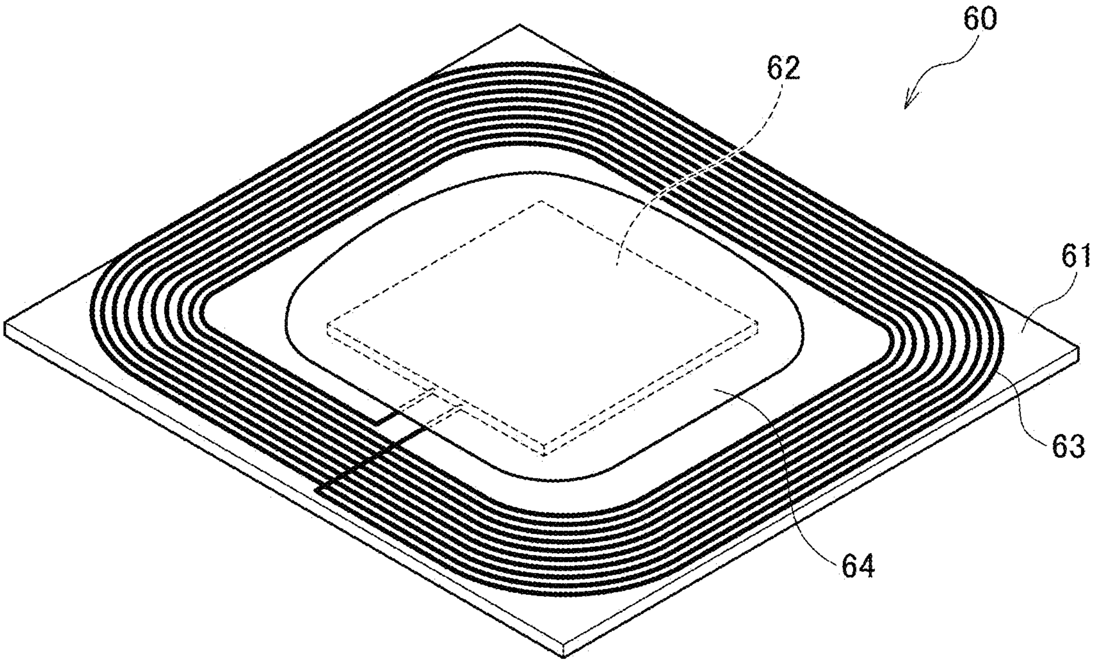
FIG. 5 is a schematic perspective view of the IC module 60 as viewed from the back surface side.

FIG. 5 is a schematic perspective view of the IC module 60 as viewed from the back surface side.

As illustrated in FIG. 5, the IC module 60 includes a module substrate 61, an IC chip mounted on or incorporated in the module substrate 61, and a coupling coil 63. The IC chip 62 is protected by being covered with a dome-shaped protective resin 64. The protective resin 64 is made of an insulating member. The terminal electrode E illustrated in FIG. 1 is provided on the surface of the module substrate 61 on the side opposite to the side on which the IC chip 62 and coupling coil 63 are provided. The IC module 60 thus configured is accommodated in the through hole 51 formed in the metal plate 50. In a state where the IC module 60 is accommodated in the through hole 51, the coupling coil 63 and second coil pattern CP2 are electromagnetically coupled to each other. Since the second coil pattern CP2 is connected to the first coil pattern CP1 functioning as an antenna coil, the IC module 60 can communicate with an external device through the first coil pattern CP1.

Figure 6:
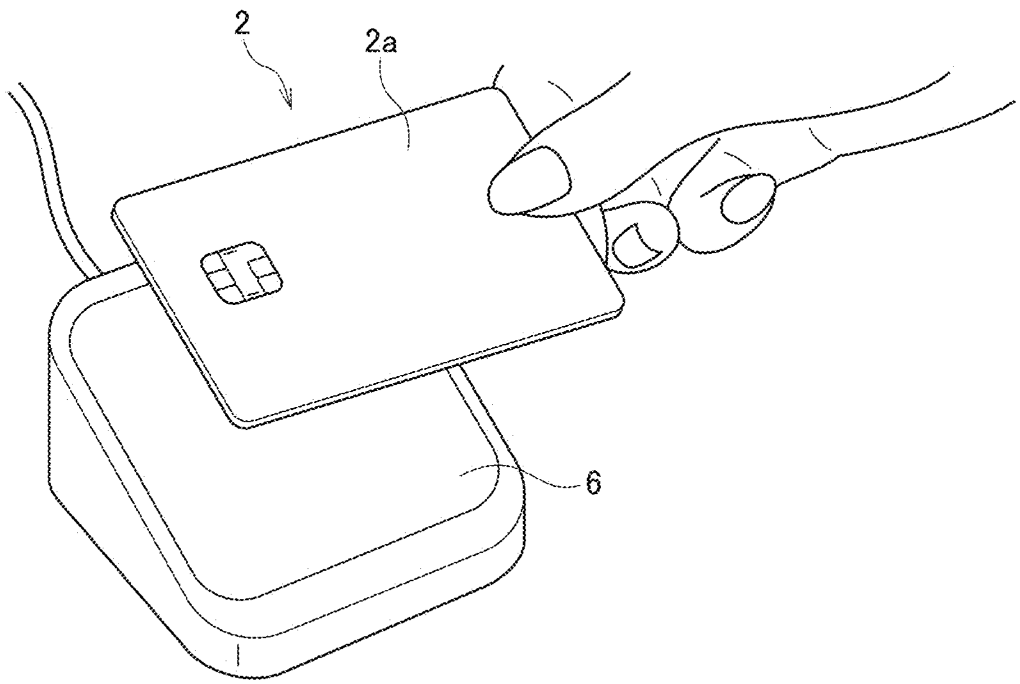
FIG. 6 is a schematic diagram showing a state in which the IC card 2 and the card reader 6 communicate with each other.

Thus, when the back surface 2*b* of the IC card 2 is made to face a card reader 6 as illustrated in FIG. 6, communication can be performed between the card reader 6 and the IC chip 62. That is, the card reader 6 is coupled to the coupling coil 63 of the IC module 60 through the coil pattern CP and can thus communicate with the IC chip 62.

Figure 7:
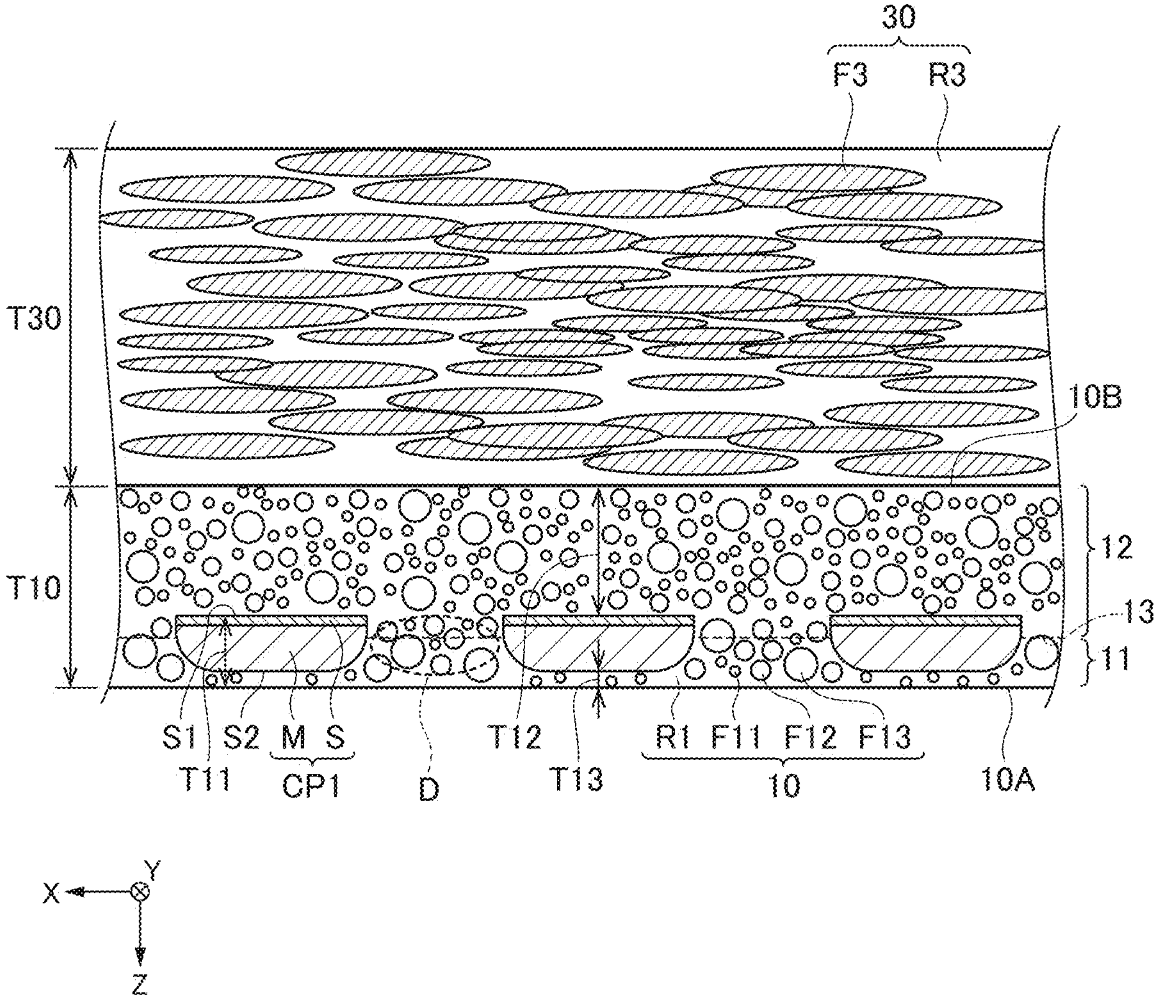
FIG. 7 is a schematic cross-sectional view taken along the line B-B in FIG. 4.
Figure 8:
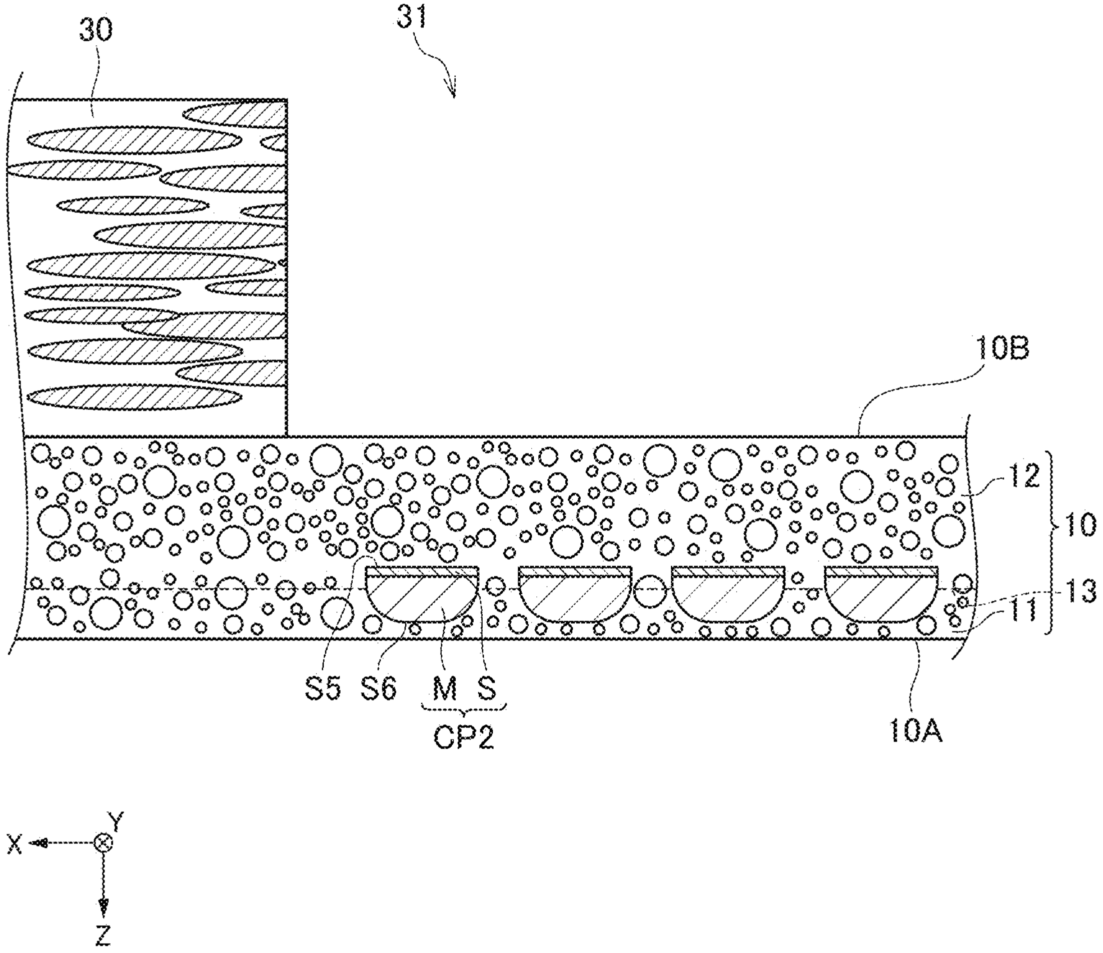
FIG. 8 is a schematic cross-sectional view taken along the line C-C in FIG. 4.

FIG. 7 is a schematic cross-sectional view taken along the line B-B in FIG. 4. FIG. 8 is a schematic cross-sectional view taken along the line C-C in FIG. 4.

As illustrated in FIGS. 7 and 8, the first and second coil patterns CP1 and CP2 are embedded in the first resin layer 10. The first resin layer 10 has a structure in which first and second layers 11 and 12 are laminated in the Z-direction. When the first and second layers 11 and 12 are formed of the same material, an interface 13 therebetween is not necessarily clear.

The first and second coil patterns CP1 and CP2 each include a seed part S containing resin and a main body part M constituted by a metal material laminated on the seed part S. The metal material constituting the main body part M may be Cu. The seed part S may contain a material functioning as a catalyst when the main body part M is formed by plating. The conductivity of the main body part M may be higher than that of the seed part S. The thickness of the main body part M may be larger than that of the seed part S. With this configuration, the resistance values of the first and second coil patterns CP1 and CP2 can be reduced.

The seed part S constitutes a first surface S1 of the first coil pattern CP1 and a fifth surface S5 of the second coil pattern CP2, and the main body part M constitutes a second surface S2 of the first coil pattern CP1 and a sixth surface S6 of the second coil pattern CP2. In the present embodiment, the entire surface of the first coil pattern CP1 including the first and second surfaces S1 and S2 and the entire surface of the second coil pattern CP2 including the fifth and sixth surfaces S5 and S6 are covered with the first resin layer 10 without being exposed.

The first and second coil patterns CP1 and CP2 are each formed on the surface of a not-shown substrate and embedded in the first layer 11, followed by removal of the substrate and formation of the second layer 12.

A thickness T11 which is the Z-direction distance between a surface 10A of the first resin layer 10 and the first surface S1 of the first coil pattern CP1 (or the fifth surface S5 of the second coil pattern CP2) may be smaller than a thickness T12 which is the Z-direction distance between a surface 10B of the first resin layer 10 and the first surface S1 of the first coil pattern CP1 (or the fifth surface S5 of the second coil pattern CP2). The surface 10B of the first resin layer 10 constitutes a third surface facing the magnetic body 30. The surface 10A of the first resin layer 10 constitutes a fourth surface positioned on the side opposite to the surface 10B. When the thickness T11 is smaller than the thickness T12, the thickness T12 is inevitably larger than a distance T13 between the second surface of the first coil pattern CP1 (or the sixth surface S6 of the second coil pattern CP2) and the surface 10A of the first resin layer 10. This means that the first coil pattern CP1 is disposed so as to be offset in the negative Z-direction from the Z-direction center of the first resin layer 10, thereby making it possible to reduce influence that the metal plate 50 has on the first coil pattern CP1. The Z-direction thickness of the first layer 11 may be smaller than the Z-direction thickness of the second layer 12.

The main body part M of the first and second coil patterns CP1 and CP2 may have a shape reduced in width in the XY plane direction, i.e., radial direction toward the positive Z-direction. The radial direction is the direction from the inner peripheral side of the coil pattern toward the outer peripheral side thereof. In this case, the first surface S1 of the coil pattern CP1 and the fifth surface S5 of the second coil pattern CP2 become larger in in width in the XY plane direction, i.e., radial direction than the second surface S2 of the first coil pattern CP1 and the sixth surface S6 of the second coil pattern CP2. With this configuration, even when the first and second coil patterns CP1 and CP2 are disposed so as to be offset in the negative Z-direction from the Z-direction center of the first resin layer 10, a sufficient volume of the first resin layer 10 is ensured in the vicinity of the surface 10A, thus improving the flatness of the surface 10A.

The first resin layer 10 may contain particles and binder resin R1. The particles contained in the first resin layer 10 may be inorganic filler particles or black-colored pigment particles. When inorganic filler particles are used as the particles contained in the first resin layer 10, insulating inorganic filler particles F11 to F13 having mutually different particle diameters may be used. The average diameter of the inorganic filler particles F11 to F13 is 0.4 μm to 13 μm. When black-colored pigment particles are used as the particles contained in the first resin layer 10, carbon blacks having an average diameter of, for example, 3 nm to 500 nm may be used.

In the example illustrated in FIG. 7, the inorganic filler particles F11 to F13 all have a spherical shape and have mutually different particle diameters. The inorganic filler particles F11 are small-diameter filler particles having a first particle diameter distribution whose average value is a first particle diameter. The inorganic filler particles F12 are middle-diameter filler particles having a second particle diameter distribution whose average value is a second particle diameter larger than the first particle diameter. The inorganic filler particles F13 are large-diameter filler particles having a third particle diameter distribution whose average value is a third particle diameter larger than the second particle diameter. By thus using the three inorganic filler particles F11 to F13 having mutually different particle diameters, the filling rate of the inorganic filler particles in the first resin layer 10 is increased.

The material of the inorganic filler particles F11 to F13 may be a nonmagnetic inorganic material such as alumina, aluminum hydroxide, talc, magnesium hydroxide, silica, calcium carbonate, barium titanate, zirconium titanate, or zinc zirconate titanate, or a magnetic material such as a ferrite or an Fe-based alloy magnetic body. Examples of the Fe-based alloy magnetic body include permalloy, sendust, Fe—Si—Cr, Fe—Si, carbonyl iron, Fe-based alloy amorphous powder containing at least Fe—Si—B, and Fe-based alloy nanocrystalline powder containing at least Fe—B—P—Cu. Using the magnetic material for the inorganic filler particles F11 to F13 increases the inductances of the first and second coil patterns CP1 and CP2. The materials of the inorganic filler particles F11 to F13 may be the same as each other, or some of the materials thereof may be different. The dielectric constant of the inorganic filler particles F11 to F13 may be higher than that of the binder resin R1.

Examples of the material of the binder resin R1 include acrylic resin, polyester resin, polyethylene resin, polyvinyl chloride resin, polyvinyl butyral resin, poly urethane resin, polyester urethane resin, cellulose resin, ABS (acrylonitrile-butadiene-styrene) resin, nitrile-butadiene rubber, styrene-butadiene rubber, epoxy resin, phenol resin, amide resin, polyester elastomer, and polyamide elastomer. The elongation percentage obtained by tensile test for resin used as the binder resin R1 may be higher than 400%.

The density of the inorganic filler particles F11 to F13 in the first resin layer 10 may be locally high at a height position same as that between the first and second surfaces S1 and S2 of the first coil pattern CP1 (at a height position same as that between the fifth and sixth surfaces S5 and S6 of the second coil pattern CP2), i.e., at an area denoted by D. This increases capacitance generated between adjacent turns of each of the first and second coil patterns CP1 and CP2.

The magnetic body 30 is used for preventing application of magnetic flux to the metal plate 50 by covering the first coil pattern CP1 as an antenna coil. The magnetic body 30 is not provided at a position overlapping the second coil pattern CP2 as a coupling coil. In other words, the magnetic body 30 is not provided at a position overlapping the through hole 51 of the metal plate 50, but the through hole 31 is formed there. A thickness T30 of the magnetic body 30 in the Z-direction is 50 μm, for example. The thickness T30 of the magnetic body 30 may be larger than the thickness T10 of the first resin layer 10. This increases the inductance of the first coil pattern CP1.

The magnetic body 30 may be a magnetic resin layer containing flat magnetic powders F3 and binder resin R3. The flat magnetic powders F3 may be made of a metal magnetic material such as sendust, permalloy, Fe—Si—Cr-based alloy magnetic body, Fe—Si—Al—Cr-based alloy magnetic body, or Fe—Al—Cr-based alloy magnetic body. The thickness direction of the flat magnetic powders F3 is the Z-direction, and the longer side direction thereof is the XY plane direction perpendicular to the Z-direction. The flat magnetic powders F3 are oriented such that the longer side direction thereof is substantially parallel to the XY plane direction. This increases the permeability of the magnetic body 30 in the XY plane direction. However, it is not strictly necessary that the longer side direction of all the flat magnetic powders F3 be parallel to the XY plane direction, and the longer side direction of some flat magnetic powders F3 may have an inclination with respect to the XY plane direction. The size of the flat magnetic powders F3 in the XY plane direction may be larger than the thickness T30 of the magnetic body 30 in the Z-direction. This further increases the permeability of the magnetic body 30 in the XY plane direction.

Examples of the material of the binder resin R3 include acrylic resin, polyester resin, polyethylene resin, polyvinyl chloride resin, polyvinyl butyral resin, polyurethane resin, polyester urethane resin, cellulose resin, ABS (acrylonitrile-butadiene-styrene) resin, nitrile-butadiene rubber, styrene-butadiene rubber, epoxy resin, phenol resin, amide resin, polyester elastomer, and polyamide elastomer. The resin material of the binder resin R3 may be the same as or different from that of the binder resin R1 contained in the first resin layer 10. The elongation percentage obtained by tensile test for resin used as the binder resin R3 may be higher than 400%. When the binder resin R1 contained in the first resin layer 10 and the binder resin R3 contained in the magnetic body 30 are made of the same resin material, adhesion between the first resin layer 10 and the magnetic body 30 is enhanced. The binder resin R3 may be added with curing agent. Adding curing agent to the binder resin R3 improves the heat resistance and moisture resistance of the magnetic body 30. When the magnetic body 30 is a magnetic resin layer containing the flat magnetic powders F3 and binder resin R3, the ratio (=F3/R3) of the flat magnetic powders F3 to the binder resin R3 may be about 4 to 8. This can enhance the permeability of the magnetic body 30. On the other hand, in the first resin layer 10, the ratio (=(F11+F12+F13/R1) of the filler particles F11 to F13 to the binder resin R1 may be smaller than the value of F3/R3. This can enhance adhesion of the first resin layer 10 with respect to the coil pattern CP and magnetic body 30.

As described above, in the coil component 1 according to the present embodiment, the first and second coil patterns CP1 and CP2 are embedded in the first resin layer without being exposed, and thus the reliability thereof is increased. Further, even when voids occur around the first and second coil patterns CP1 and CP2, they are confined in the first resin layer 10, so that the reliability of the coil patterns CP1 and CP2 is even more increased. In addition, since the first coil pattern CP1 is not exposed from the first resin layer 10, the flatness of the surfaces 10A and 10B of the first resin layer 10 is improved. Furthermore, since the substrate used to form the first and second coil patterns CP1 and CP2 is removed, the entire thickness is reduced.

Figure 9:
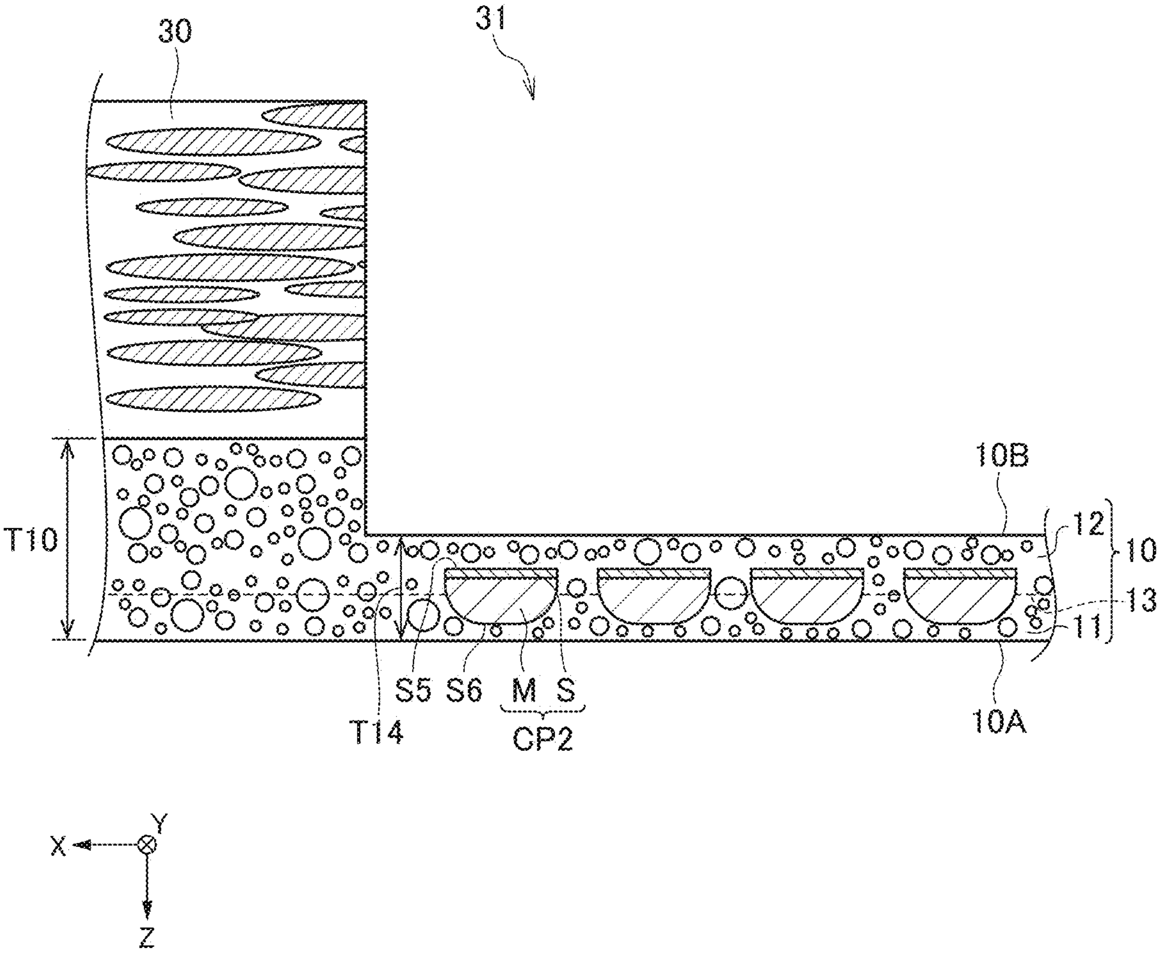
FIG. 9 is a schematic cross-sectional view for explaining a first modification, which illustrates a cross section taken along the line C-C in FIG. 4.

FIG. 9 is a schematic cross-sectional view for explaining a first modification, which illustrates a cross section taken along the line C-C in FIG. 4.

The first modification illustrated in FIG. 9 differs from the structure illustrated in FIG. 8 in that the thickness of the first resin layer 10 is locally reduced at a position overlapping the through hole 31 of the magnetic body 30. Specifically, a thickness T14 of the first resin layer 10 at a position overlapping the through hole 31 is smaller than the thickness T10 of the first resin layer 10 at a position overlapping the magnetic body 30. Other basic configurations are the same as those of the structure illustrated in FIG. 8, so the same reference numerals are given to the same elements, and overlapping description will be omitted.

The second coil pattern CP2 is embedded in the first resin layer 10 without being exposed therefrom. This can protect the second coil pattern CP2 and prevent interference between the IC module 60 and the first resin layer 10 even when the IC module 60 has a large thickness.

Figure 10:
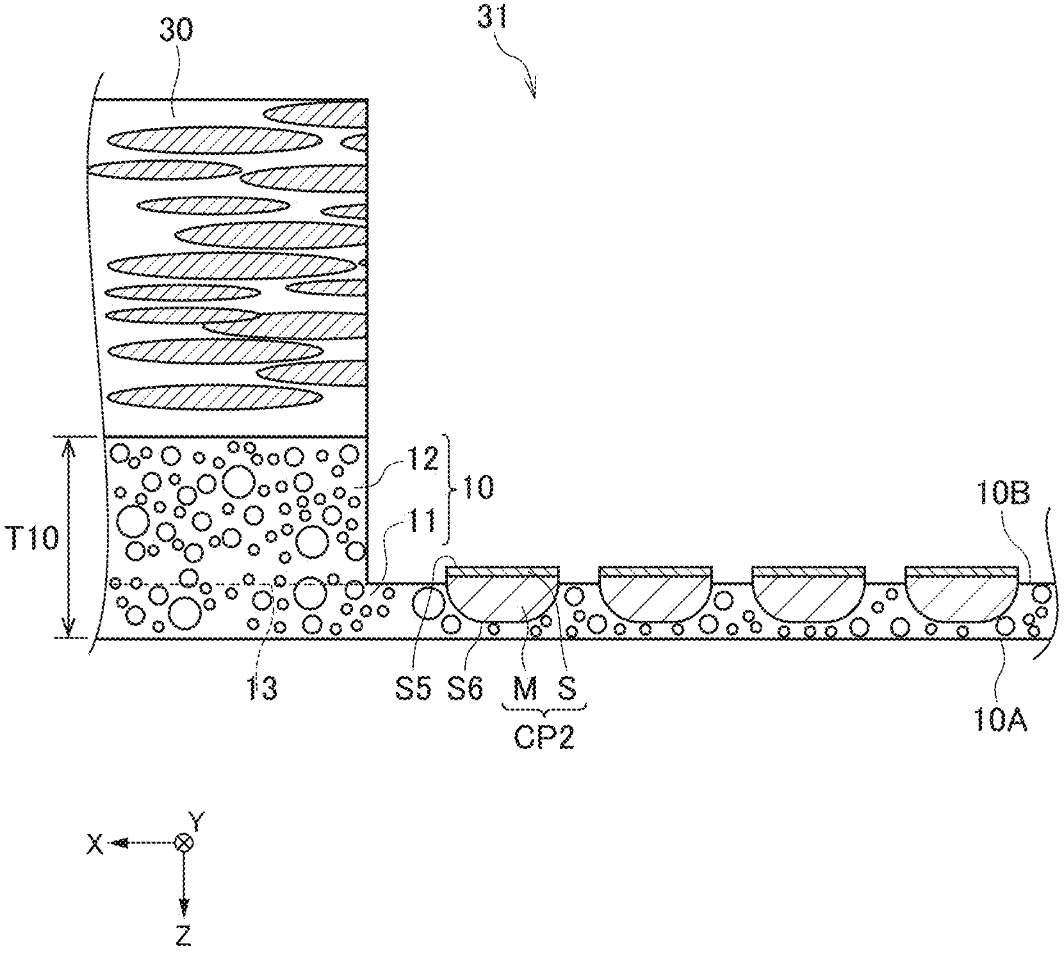
FIG. 10 is a schematic cross-sectional view for explaining a second modification, which illustrates a cross section taken along the line C-C in FIG. 4.

FIG. 10 is a schematic cross-sectional view for explaining a second modification, which illustrates a cross section taken along the line C-C in FIG. 4.

In the second modification illustrated in FIG. 10, the thickness of the first resin layer 10 is further reduced at a position overlapping the through hole 31 of the magnetic body 30, with the result that a part of the second coil pattern CP2 is exposed from the first resin layer 10 with the other part thereof embedded in the first resin layer 10. As illustrated in FIG. 10, the entire second layer 12 constituting the first resin layer 10 is removed at a position overlapping the through hole 31 of the magnetic body 30. As a result, the first layer 11 is present at a position overlapping the through hole 31, whereas the second layer 12 is absent there. Other basic configurations are the same as those of the structure illustrated in FIG. 9, so the same reference numerals are given to the same elements, and overlapping description will be omitted.

Thus, even when the IC module 60 has a large thickness, it is possible to prevent interference between the IC module 60 and the first resin layer 10 and between the IC module 60 and the second coil pattern CP2. The first surface S1 of the second coil pattern CP2 that is exposed from the first resin layer 10 is constituted by the seed part S having a conductivity lower than that of the main body part M, so that there is substantially no reduction in reliability due to the exposure of the second coil pattern CP2.

Figure 11:
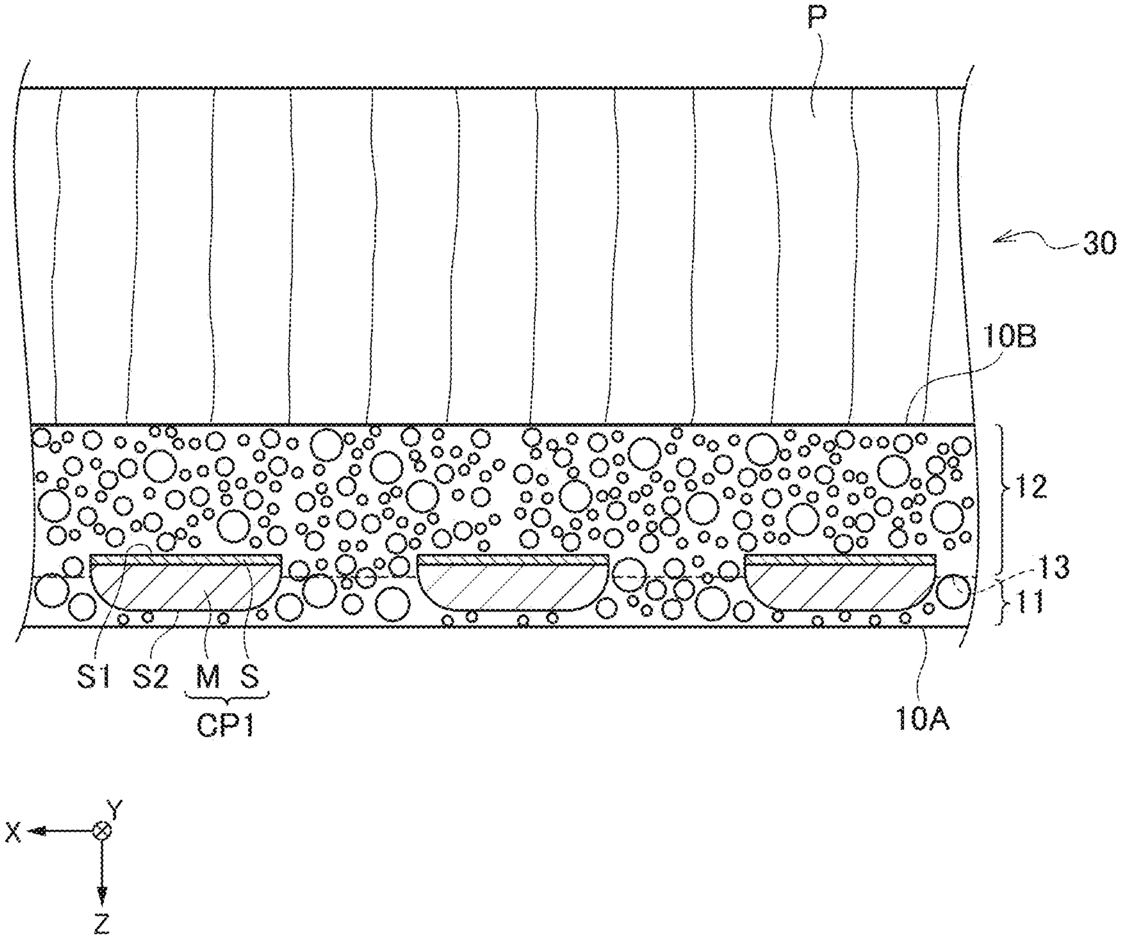
FIG. 11 is a schematic cross-sectional view for explaining a third modification, which illustrates a cross section taken along the line C-C in FIG. 4.

FIG. 11 is a schematic cross-sectional view for explaining a third modification, which illustrates a cross section taken along the line C-C in FIG. 4.

The third modification illustrated in FIG. 11 differs from the structure illustrated in FIG. 7 in that the magnetic body 30 is constituted by a ferrite sintered body. Other basic configurations are the same as those of the structure illustrated in FIG. 7, so the same reference numerals are given to the same elements, and overlapping description will be omitted.

As exemplified by this, the magnetic body 30 may be a ferrite sintered body. This can further increase the inductance of the first coil pattern CP1. The ferrite sintered body may be an aggregate of individual pieces P divided by cracks extending in the Z-direction. This can prevent breakage of the magnetic body 30 constituted by the ferrite sintered body. It is not strictly necessary that the cracks extend in the Z-direction and may include one having an inclination with respect to the Z-direction and one extending in the XY plane direction. Further, the binder resin R1 constituting the first resin layer 10 may enter the clearance (crack) between the individual pieces P of the ferrite sintered body. Thus, the individual pieces P are fixed to each other by the binder resin R1, making it possible to enhance the strength of the magnetic body 30. Note that the binder resin R1 may enter only some clearances or only the first resin layer 10 side of the clearance.

Figure 12:
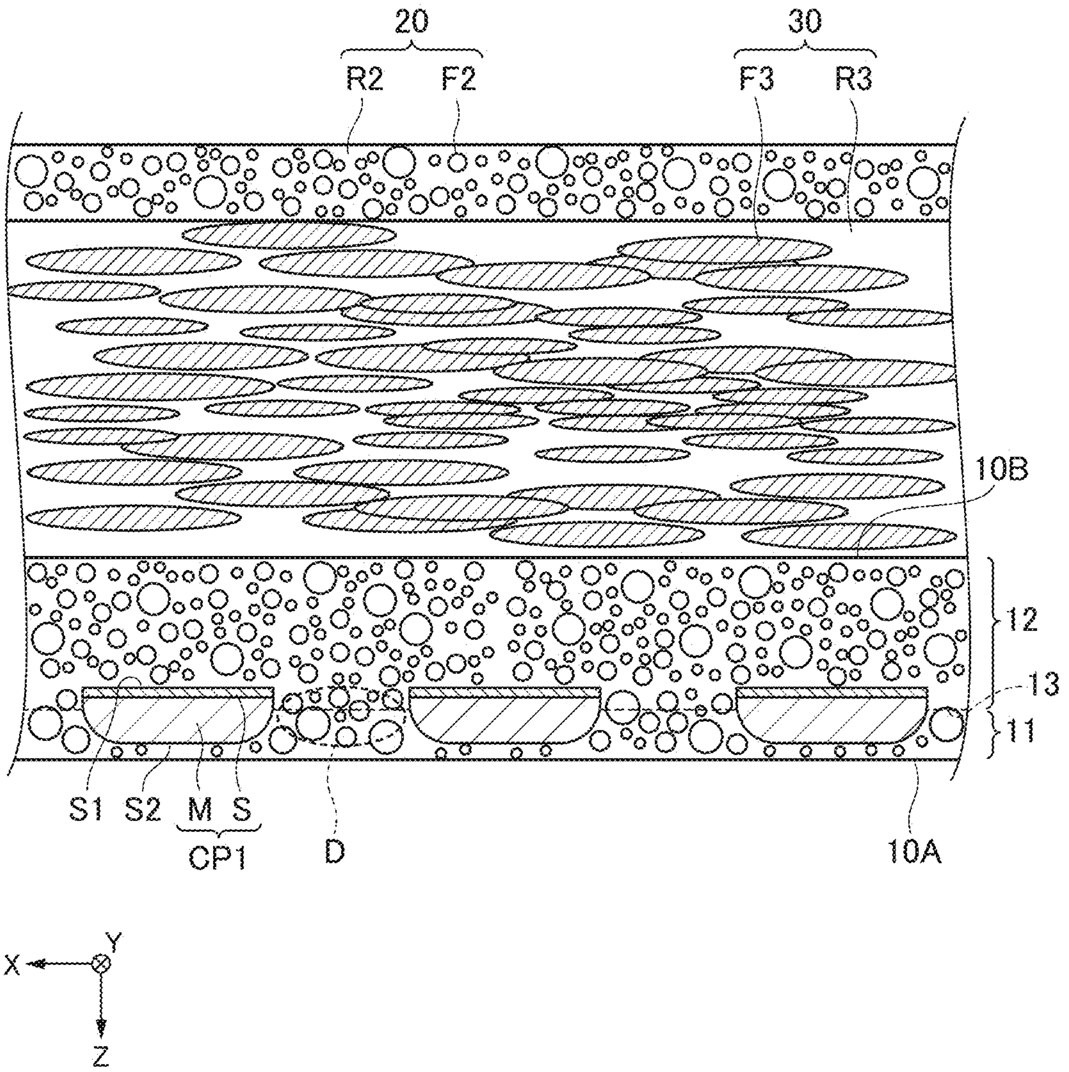
FIG. 12 is a schematic cross-sectional view for explaining a fourth modification, which illustrates a cross section taken along the line C-C in FIG. 4.

FIG. 12 is a schematic cross-sectional view for explaining a fourth modification, which illustrates a cross section taken along the line C-C in FIG. 4.

The fourth modification illustrated in FIG. 12 differs from the structure illustrated in FIG. 7 in that it further includes a second resin layer 20 positioned on the side opposite to the first resin layer 10 with respect to the magnetic body 30. Other basic configurations are the same as those of the structure illustrated in FIG. 7, so the same reference numerals are given to the same elements, and overlapping description will be omitted.

The second resin layer 20 may be formed of the same material as the first resin layer 10. That is, the second resin layer 20 may contain inorganic filler particles F2 having the same spherical shape as those of the filler particles F11 to F13 contained in the first resin layer 10 and the binder resin R2 same as the binder resin R1 contained in the first resin layer 10. The second resin layer 20 need not embed therein the coil pattern CP, so that the ratio of the filler particles to the binder resin can be made higher than that in the first resin layer 10, whereby the strength of the second resin layer 20 can be enhanced.

As described above, when the magnetic body 30 is sandwiched between the first and second resin layers 10 and 20, it can be protected from both surface sides thereof. Further, the magnetic body 30 can be bonded to the another member through the second resin layer 20. For example, the second resin layer 20 can be used as an adhesive layer in place of the adhesive layer 72 illustrated in FIG. 3.

While some embodiments of the present disclosure has been described, the present disclosure is not limited to the above embodiment, and various modifications may be made within the scope of the present disclosure, and all such modifications are included in the present disclosure.

For example, the second resin layer 20 may be added to the structure illustrated in FIG. 11 in which the magnetic body 30 is constituted by the ferrite sintered body.

The technology according to the present disclosure includes the following configuration examples but not limited thereto.

A coil component according to an embodiment of the present disclosure includes: a magnetic body having a main surface; a first coil pattern disposed so as to overlap the main surface of the magnetic body; and a first resin layer disposed so as to overlap the main surface of the magnetic body and containing particles and binder resin. The first coil pattern has a first surface facing the main surface of the magnetic body and a second surface positioned on a side opposite to the first surface. The first coil pattern is embedded in the first resin layer such that at least the first and second surfaces of the first coil pattern are covered with the first resin layer. This can increase the reliability of the first coil pattern while reducing the entire thickness.

In the above coil component, the first resin layer may have a third surface facing the main surface of the magnetic body and a fourth surface positioned on the side opposite to the third surface, and the distance between the first surface of the first coil pattern and the third surface of the first resin layer may be larger than the distance between the second surface of the first coil pattern and the fourth surface of the first resin layer. Thus, even when a metal member such as a metal plate is disposed on a surface of the magnetic body on the side opposite to the first resin layer, the distance between the first coil pattern and the metal member can be increased.

In the above coil component, the first surface of the first coil pattern may be larger in radial width than the second surface of the first coil pattern. This can improve the flatness of the first resin layer.

In the above coil component, the first coil pattern may include a seed part containing resin and a main body part laminated on the seed part and constituted by a metal material, the seed part may constitute the first surface, and the main body part may constitute the second surface. Thus, even when a metal member such as a metal plate is disposed on a surface of the magnetic body on the side opposite to the first resin layer, the coil component can achieve improved magnetic characteristics.

The above coil component may further include a second coil pattern connected to the first coil pattern and positioned on the same plane as the first coil pattern, the magnetic body may have a through hole, and the second coil pattern may overlap the through hole. Thus, when an IC module or the like is disposed at a position overlapping the through hole, the second coil pattern can function as a coupling coil.

In the above coil component, the thickness of the first resin layer may be smaller at a position overlapping the through hole than at a position overlapping the magnetic body. Thus, even when the IC module has a large thickness, interference between the IC module and the coil component can be prevented. In this case, the second coil pattern may be embedded in the first resin layer, the second coil pattern may have a fifth surface facing the through hole and a sixth surface positioned on a side opposite to the fifth surface, and the fifth and sixth surfaces may be covered with the first resin layer. In this case, the second coil pattern is protected by the first resin layer. Alternatively, the second coil pattern may include a seed part containing resin and a main body part laminated on the seed part and constituted by a metal material, a part of the second coil pattern that includes the seed part may be exposed from the first resin layer, and the other part of the second coil pattern that includes the main body part may be embedded in the first resin layer. Thus, even when the IC module has a larger thickness, interference between the IC module and the coil component can be prevented.

In the above coil component, the particles may contain inorganic filler particles, and the density of the inorganic filler particles in the first resin layer may be locally high at a height position same as that between the first and second surfaces of the first coil pattern. This increases capacitance generated between adjacent turns of the first coil pattern.

The above coil component may further include a second resin layer covering the magnetic body such that the magnetic body is sandwiched between the first resin layer and the second resin layer. Thus, the magnetic body can be protected from both surface sides thereof.

An IC card according to an embodiment of the present disclosure includes the above-described coil component. Thus, there can be provided a thin and highly reliable IC card.

What is claimed is:

1. A coil component comprising:

a magnetic body having a main surface;

a first coil pattern disposed to overlap the main surface of the magnetic body; and a first resin layer disposed to overlap the main surface of the magnetic body and containing particles and binder resin, wherein the first coil pattern has a first surface facing the main surface of the magnetic body and a second surface positioned on a side opposite to the first surface, and wherein the first coil pattern is embedded in the first resin layer such that at least the first and second surfaces of the first coil pattern are covered with the first resin layer, wherein the first resin layer has a third surface facing the main surface of the magnetic body and a fourth surface positioned on a side opposite the third surface, wherein a distance between the first surface of the first coil pattern and the third surface of the first resin layer is larger than a distance between the second surface of the first coil pattern and the fourth surface of the first resin layer, wherein the particles include first and second inorganic filler particles, and wherein an average value of a particle diameter distribution of the second inorganic filler particles is larger than an average value of a particle diameter distribution of the first inorganic filler particles.

2. The coil component as claimed in claim 1, wherein the first surface of the first coil pattern is larger in radial width than the second surface of the first coil pattern.

3. The coil component as claimed in claim 2, wherein the first coil pattern includes a seed part containing resin and a main body part laminated on the seed part and constituted by a metal material, wherein the seed part constitutes the first surface, and wherein the main body part constitutes the second surface.

4. The coil component as claimed in claim 1, further comprising a second coil pattern connected to the first coil pattern and positioned on a same plane as the first coil pattern, wherein the magnetic body has a through hole, and wherein the second coil pattern overlaps the through hole.

5. The coil component as claimed in claim 4, wherein a thickness of the first resin layer is smaller at a position overlapping the through hole than at a position overlapping the magnetic body.

6. The coil component as claimed in claim 5, wherein the second coil pattern is embedded in the first resin layer, wherein the second coil pattern has a fifth surface facing the through hole and a sixth surface positioned on a side opposite to the fifth surface, and wherein the fifth and sixth surfaces are covered with the first resin layer.

7. The coil component as claimed in claim 5, wherein the second coil pattern includes a seed part containing resin and a main body part laminated on the seed part and constituted by a metal material, wherein a part of the second coil pattern that includes the seed part is exposed from the first resin layer, and wherein another part of the second coil pattern that includes the main body part is embedded in the first resin layer.

8. The coil component as claimed in claim 1, wherein the particles contain inorganic filler particles, and wherein a density of the inorganic filler particles in the first resin layer is locally high at a height position same as that between the first and second surfaces of the first coil pattern.

9. The coil component as claimed in claim 1, further comprising a second resin layer covering the magnetic body such that the magnetic body is sandwiched between the first resin layer and the second resin layer.

10. The coil component as claimed in claim 1, wherein the particles include insulating inorganic filler particles, and wherein the insulating inorganic filler particles comprise at least one of alumina, aluminum hydroxide, talc, magnesium hydroxide, silica, calcium carbonate, barium titanate, zirconium titanate, or zinc zirconate titanate.

11. The coil component as claimed in claim 1, wherein the magnetic body comprises a ferrite sintered body.

12. The coil component as claimed in claim 11, wherein the ferrite sintered body comprises an aggregate of individual pieces divided by cracks.

13. An IC card comprising a coil component, wherein the coil component comprises:

a magnetic body having a main surface;

a first coil pattern disposed to overlap the main surface of the magnetic body; and a first resin layer disposed to overlap the main surface of the magnetic body and containing particles and binder resin, wherein the first coil pattern has a first surface facing the main surface of the magnetic body and a second surface positioned on a side opposite to the first surface, and wherein the first coil pattern is embedded in the first resin layer such that at least the first and second surfaces of the first coil pattern are covered with the first resin layer, wherein the first resin layer has a third surface facing the main surface of the magnetic body and a fourth surface positioned on a side opposite the third surface, wherein a distance between the first surface of the first coil pattern and the third surface of the first resin layer is larger than a distance between the second surface of the first coil pattern and the fourth surface of the first resin layer, wherein the particles include first and second inorganic filler particles, and wherein an average value of a particle diameter distribution of the second inorganic filler particles is larger than an average value of a particle diameter distribution of the first inorganic filler particles.

* * * * *